(12) United States Patent
Chang et al.

(10) Patent No.: US 12,062,988 B2
(45) Date of Patent: Aug. 13, 2024

(54) AUXILIARY POWER CIRCUIT, BALANCE CIRCUIT, AND POWER SUPPLY SYSTEM

(71) Applicant: DELTA ELECTRONICS, INC., Taoyuan (TW)

(72) Inventors: Che-Wei Chang, Taoyuan (TW); Wen-Lung Huang, Taoyuan (TW); Sheng-Hua Li, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 291 days.

(21) Appl. No.: 17/735,772

(22) Filed: May 3, 2022

(65) Prior Publication Data
US 2023/0145504 A1   May 11, 2023

(30) Foreign Application Priority Data
Nov. 10, 2021   (CN) .......................... 202111326734.5

(51) Int. Cl.
 *H02M 3/335* (2006.01)
 *H02M 1/00* (2006.01)
(52) U.S. Cl.
 CPC ....... *H02M 3/3353* (2013.01); *H02M 1/0058* (2021.05); *H02M 3/33592* (2013.01)
(58) Field of Classification Search
 CPC .......... H02M 3/3353; H02M 3/33592; H02M 1/0058
 USPC ........................................................ 363/16
 See application file for complete search history.

(56) References Cited

U.S. PATENT DOCUMENTS

| | | | | |
|---|---|---|---|---|
| 6,373,223 | B1 * | 4/2002 | Anzawa | H02J 7/0018 320/118 |
| 8,269,455 | B2 * | 9/2012 | Marten | H02M 3/33571 324/426 |
| 9,231,420 | B2 * | 1/2016 | Jo | H02J 7/0031 |
| 10,177,669 | B1 * | 1/2019 | Chiu | H02M 3/33571 |
| 11,056,878 | B2 | 7/2021 | Gao et al. | |
| 2019/0149063 | A1 | 5/2019 | Onda et al. | |

FOREIGN PATENT DOCUMENTS

| | | |
|---|---|---|
| DE | 10157003 A1 | 5/2002 |
| EP | 2945257 B1 | 11/2019 |
| WO | 2018061077 A1 | 4/2018 |

OTHER PUBLICATIONS

Search Report dated Oct. 18, 2022 of the corresponding European patent application No. 22170771.4.

* cited by examiner

*Primary Examiner* — Yemane Mehari
(74) *Attorney, Agent, or Firm* — Muncy, Geissler, Olds & Lowe, P.C.

(57) ABSTRACT

An auxiliary power circuit of a conversion module is used to supply power to a control unit, and an input end of the conversion module includes an even number of energy storage units coupled in series. The auxiliary power circuit includes an even number of primary-side circuits and a secondary-side circuit. Each primary-side circuit includes a first switch unit, a second switch unit, and a resonance tank. The first switch unit is connected to the second switch unit in series, and is correspondingly connected to one of the energy storage units in parallel. The resonance tank is connected to the second switch unit in parallel. The secondary-side circuit is coupled to the resonance tanks of two of the primary-side circuits to acquire power and supply power to the control unit.

19 Claims, 7 Drawing Sheets

AUXILIARY POWER CIRCUIT, BALANCE CIRCUIT, AND POWER SUPPLY SYSTEM

BACKGROUND

Technical Field

The present disclosure relates to an auxiliary power circuit, a balance circuit, and a power supply system, and more particularly to an auxiliary power circuit of a conversion module with a voltage balance function, a balance circuit of the conversion module, and a power supply system having the conversion module.

Description of Related Art

The statements in this section merely provide background information related to the present disclosure and do not necessarily constitute prior art.

Figure 1:
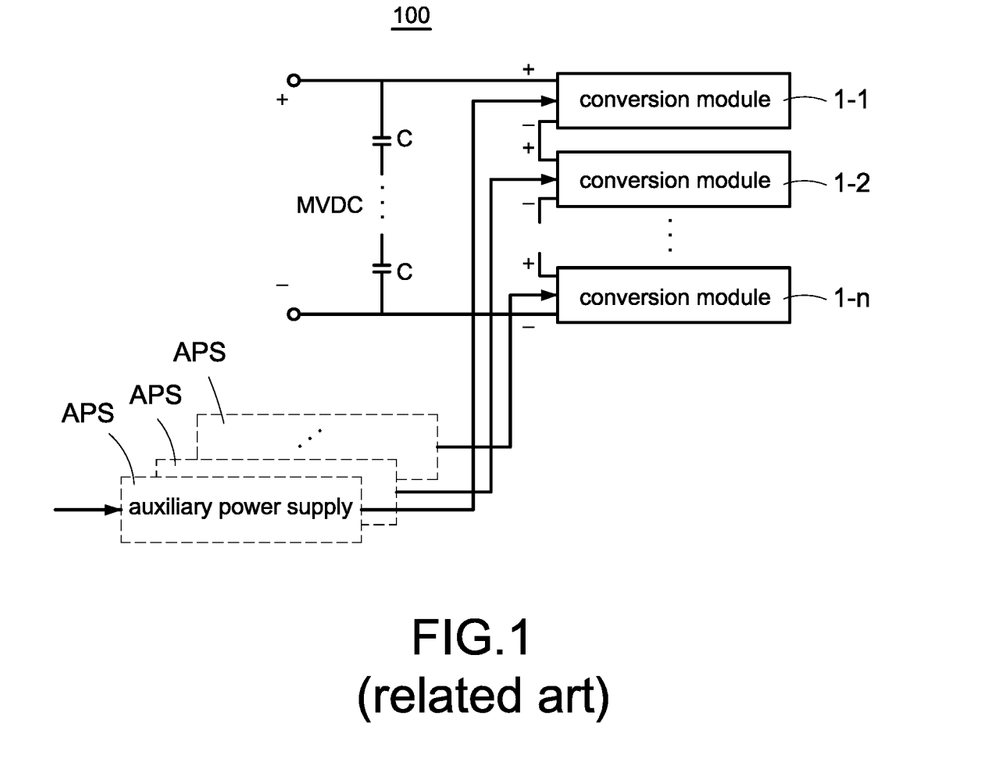
FIG. 1 is a block diagram of a conventional power supply system.

Please refer to FIG. 1, which shows a block diagram of a conventional power supply system. The currently used medium-voltage DC (MVDC) power supply system 100 includes a plurality of conversion modules 1-1 to 1-n with input terminals coupled in series. The auxiliary power supply (APS) that supplies power to the internal controller of the power supply system 100 are mostly powered externally (indicated by the arrow pointing to the APS), rather than self-powered. The reason is that the medium-voltage DC (MVDC) is usually greater than 1500 volts, even as high as tens of kilovolts, and therefore the power supply system can usually receive the kilovolt-level medium-voltage DC. If in the form of self-powered, the auxiliary power supply APS must have the insulation capability of medium voltage isolation to convert power up to several tens of kilovolts to a power supply controller below 50 volts. Otherwise, external power supply must be required. However, these two situations are nothing more than the need to use a larger and more expensive isolation transformer, or the need for an additional power supply for powering, both increase the circuit volume and cost.

Using the auxiliary power supply APS in the form of self-powered, usually the conversion modules 1-1 to 1-n are respectively coupled to the capacitors C at the input terminal thereof to use the power stored in the capacitors C. Therefore, in addition to the insulation capability of medium voltage isolation, the auxiliary power supply APS using the self-powered auxiliary power circuit 100 must also maintain a voltage balance of the power at the input terminals of the conversion modules 1-1 to 1-n so as to avoid the rear-stage controller (or other circuits, etc.) of each conversion module 1-1 to 1-n from entering the protection state due to overvoltage condition. Therefore, an additional voltage balance circuit must be added (which leads to an increase in circuit volume and cost) and the present voltage balance circuit is also unable to perform rapid voltage balance control on the capacitors C.

Accordingly, the present disclosure is to provide an auxiliary power circuit, a balance circuit, and a power supply system to make the energy storage voltages of the energy storage units naturally transfer energy to each other according to the voltage level, and the excessively high energy can be recycled and used in a coupling manner.

SUMMARY

In order to solve the above-mentioned problems, the present disclosure provides an auxiliary power circuit of a conversion module for supplying power to a control unit. An input end of the conversion module includes an even number of energy storage units coupled in series, and each energy storage unit includes a first end and a second end. The auxiliary power circuit includes an even number of primary-side circuits and a secondary-side circuit. Each primary-side circuit includes a first switch unit, a second switch unit, and a resonance tank. The first switch unit includes a first end and a second end, and the first end of the first switch unit is correspondingly coupled to the first end of one of the energy storage units. The second switch unit includes a first end and a second end, and the first end of the second switch unit is coupled to the second end of the first switch unit, and the second end of the second switch unit is correspondingly coupled to the second end of one of the energy storage units. The resonance tank is coupled in parallel to the second switch unit. The secondary-side circuit includes at least one induction unit and a rectification circuit. The at least one induction unit is coupled to the two resonance tanks of the two primary-side circuits. The rectification circuit is coupled to the at least one induction unit and the control unit, and rectifies a power provided by the at least one induction unit into a DC power and supply the DC power to the control unit.

In order to solve the above-mentioned problems, the present disclosure provides a balance circuit of a conversion module. An input end of the conversion module includes an even number of energy storage units coupled in series, and each energy storage unit includes a first end and a second end. The balance circuit includes an even number of primary-side circuits and a secondary-side circuit. Each primary-side circuit includes a first switch unit, a second switch unit, and a resonance tank. The first switch unit includes a first end and a second end, and the first end of the first switch unit is correspondingly coupled to the first end of one of the energy storage units. The second switch unit includes a first end and a second end, and the first end of the second switch unit is coupled to the second end of the first switch unit, and the second end of the second switch unit is correspondingly coupled to the second end of one of the energy storage units. The resonance tank is coupled in parallel to the second switch unit. The secondary-side circuit includes a plurality of induction units coupled in parallel to each other, and respectively coupled to the two resonance tanks of the two primary-side circuits. The number of the primary-side circuits is at least four.

In order to solve the above-mentioned problems, the present disclosure provides a power supply system. The power supply system includes a plurality of conversion modules, and each conversion module includes an input end, and the input ends of the plurality of conversion modules are coupled in series. The input end includes an even number of energy storage units coupled in series, and each energy storage unit includes a first end and a second end. Each conversion module includes an auxiliary power circuit, a power stage circuit, and a control unit. The auxiliary power circuit includes an even number of primary-side circuits and a secondary-side circuit. Each primary-side circuit includes a first switch unit, a second switch unit, and a resonance tank. The first switch unit includes a first end and a second end, and the first end of the first switch unit is correspondingly coupled to the first end of one of the energy storage units. The second switch unit includes a first end and a second end, and the first end of the second switch unit is coupled to the second end of the first switch unit, and the second end of the second switch unit is correspondingly coupled to the second end of one of the energy storage units.

The resonance tank is coupled in parallel to the second switch unit. The secondary-side circuit includes at least one induction unit and a rectification circuit. The at least one induction unit is coupled to the two resonance tanks of the two primary-side circuits. The rectification circuit is coupled to the at least one induction unit, and rectifies a power provided by the at least one induction unit into a DC power. The power stage circuit is coupled to the input end. The control unit is coupled to the rectification circuit and the power stage circuit, and receives the DC power to operate and to control the power stage circuit.

The main purpose and effect of the present disclosure is that the resonance tanks used by the two primary-side circuits of the primary-side module have a symmetrical circuit structure and the same parameters, and therefore the energy storage voltages of the energy storage units naturally transfer energy to each other according to the voltage level, and the excessively high energy can be recycled and used in a coupling manner and the response speed is also faster since the power consumption is not performed by resistors.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Reference will now be made to the drawing figures to describe the present disclosure in detail. It will be understood that the drawing figures and exemplified embodiments of present disclosure are not limited to the details thereof.

Figure 2:
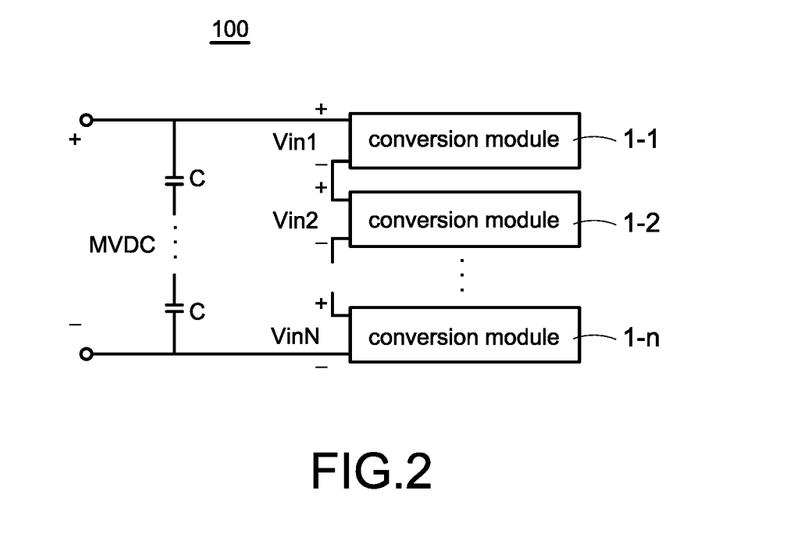
FIG. 2 is a block diagram of a power supply system with a voltage balance function according to the present disclosure.

Please refer to FIG. 2, which shows a block diagram of a power supply system with a voltage balance function according to the present disclosure. The power supply system 100 is mainly applied to a solid state transformer (SST), also known as a power electronic transformer. The power supply system 100 receives a medium-voltage DC MVDC. In such a high voltage application, an input end of the power supply system 100 includes a plurality of capacitors C coupled in series to stabilize (regulate) the voltage value of the medium-voltage DC MVDC, and a plurality of conversion modules 1-1 to 1-n are used to equally distribute (share) the medium-voltage DC MVDC. Specifically, the power supply system 100 includes a plurality of conversion modules 1-1 to 1-n, and a plurality of input ends of the plurality of conversion modules 1-1 to 1-n are coupled in series to equally distribute the medium-voltage DC MVDC. That is, the voltage value of the medium-voltage DC MVDC (namely a voltage across a plurality of capacitors C coupled in series) is the sum of a plurality of input voltages Vin1-VinN of the plurality of conversion modules 1-1 to 1-n. The output ends (not shown) of the conversion modules 1-1 to 1-n may be coupled in series, coupled in parallel, or independently output, which is not limited here.

Figure 3:
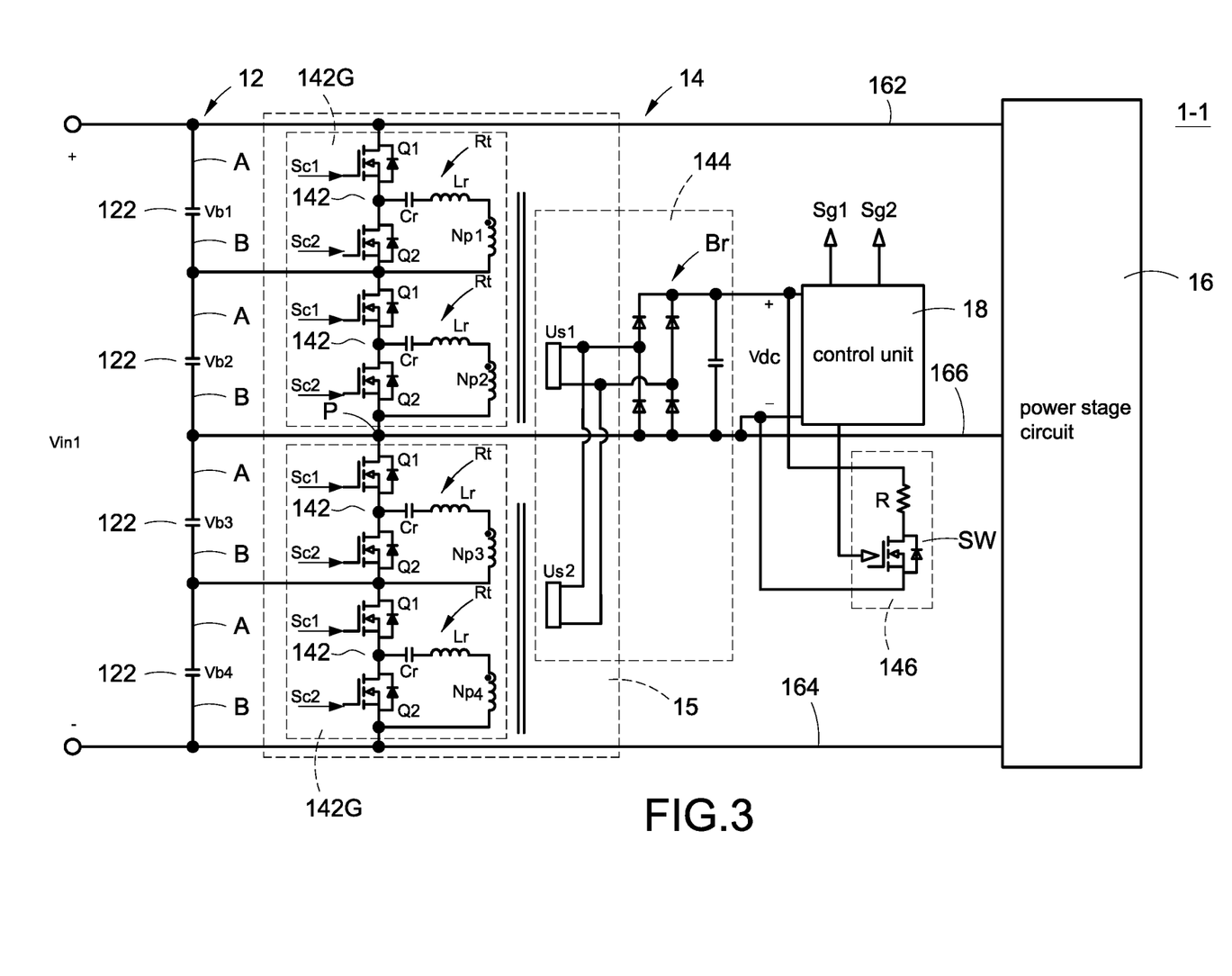
FIG. 3 is a block circuit diagram of a conversion module with the voltage balance function according to a first embodiment of the present disclosure.

Please refer to FIG. 3, which shows a block circuit diagram of a conversion module with the voltage balance function according to a first embodiment of the present disclosure, and also refer to FIG. 2. Take the conversion module 1-1 as an example, the conversion module 1-1 includes an input end 12, an auxiliary power circuit 14, a power stage circuit 16, and a control unit 18. The input end 12 receives the input voltage Vin1, and incudes a plurality (even number) of energy storage units 122 coupled in series, such as four energy storage units 122 shown in FIG. 3, but the present disclosure is not limited by this. In particular, the energy storage unit 122 may be a single capacitor or a plurality of capacitor assemblies coupled in series. Each energy storage unit 122 includes a first end A and a second end B, and the plurality of energy storage units 122 are coupled in series with the first end A as the head (front) and the second end B as the tail (rear). The sum of a plurality of energy storage voltages Vb1-Vb4 of the energy storage units 122 is the input voltage Vin1. The auxiliary power circuit 14 is coupled to the input end 12 and the control unit 18, and is used to convert the input voltage Vin1 to supply power to the control unit 18. The power stage circuit 16 may generally be a switching power conversion circuit, and the interior thereof is usually composed of components such as, but not limited to, switches, capacitors, and inductors. For example, but not limited to, the power stage circuit 16 may be a neutral point clamped (NPC) (for example, three-level, five-level) conversion circuit, which is commonly used in high-power applications, especially applications with a power of several million watts.

The power stage circuit 16 is coupled to the input end 12, and the control unit 18 is coupled to the switch/switches inside the power stage circuit 16. The control unit 18 provides a first control signal assembly Sg1 to control the switching of the switch/switches so as to control the power stage circuit 16 to convert the input voltage Vin1 into the voltage required by other rear-stage circuits. Take a three-level conversion circuit as an example, the power stage circuit 16 includes a first bus terminal 162, a second bus terminal 164, and a potential terminal 166. The first bus terminal 162 is coupled to the first end A of the first series-connected energy storage unit 122, and the second bus terminal 164 is coupled to the second end B of the last series-connected energy storage unit 122. If the power stage circuit 16 is a five-level conversion circuit, the power stage circuit 16 includes one first bus terminal 162, one second bus terminal 164, and three potential terminals 166-1 to 166-3.

The auxiliary power circuit 14 includes a plurality (even number) of primary-side circuits 142 and a secondary-side circuit 144, for example, four primary-side circuits 142 and one secondary-side circuit 144 as shown in FIG. 3, but the present disclosure is not limited by this. The primary-side circuits 142 are coupled to the input end 12, and each primary-side circuit 142 includes a first switch unit Q1, a second switch unit Q2, and a resonance tank Rt. The secondary-side circuit 144 is coupled to the control unit 18, and the secondary-side circuit 144 includes a plurality of induction units Us1-Us2 and a rectification circuit Br. The first switch unit Q1 includes a first end and a second end, and the first end is correspondingly coupled to the first end A of one of the energy storage units 122. The second switch unit Q2 includes a first end and a second end, and the first end is coupled to the second end of the first switch unit Q1, and the second end is correspondingly coupled to the second end of the same energy storage unit 122. The resonance tank Rt is connected in parallel to the second switch unit Q2, and two primary-side circuits 142 are formed/integrated into one primary-side module 142G. The potential terminal 166 is coupled to a node P between two primary-side modules 142G. The resonance tanks Rt of the same primary-side modules 142G have corresponding circuit structures and the same parameters.

Figure 4:
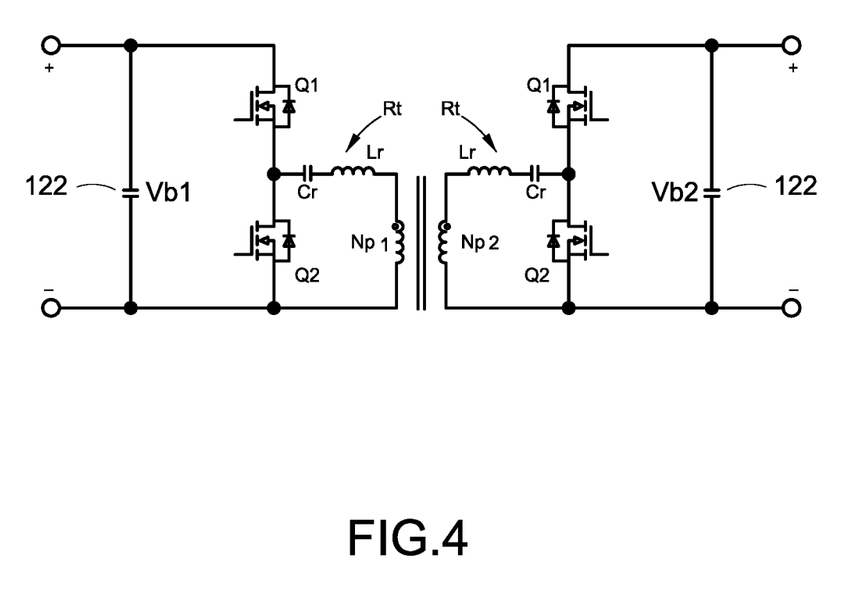
FIG. 4 is a circuit diagram of a primary-side module according to the present disclosure.

Please refer to FIG. 4, which shows a circuit diagram of a primary-side module according to the present disclosure. Take a single primary-side module 142G in FIG. 3 as an example. The resonance tank Rt includes a capacitor Cr, an inductor Lr, and a first winding Np1/Np2. A first end of the capacitor Cr is coupled to the second end of the first switch unit Q1, and a first end of the inductor Lr is coupled to a second end of the capacitor Cr. A first end of the first winding Np1(Np2) is coupled to a second end of the inductor Lr, and a second end of the first winding Np1(Np2) is coupled to a second end of the second switch unit Q2. In the primary-side module 142G, the first windings Np1, Np2 of the two resonance tanks Rt have a common-core circuit structure so that the two resonance tanks Rt can be coupled and transfer (deliver) energy to each other. Specifically, take the primary-side circuits 142 corresponding to the energy storage voltages Vb1, Vb2 having the common-core circuit structure as an example. The resonance tanks Rt used by the two primary-side circuits 142 of the primary-side module 142G have a symmetrical circuit structure and the same parameters, and therefore the first switch unit Q1 and the second switch unit Q2 can be complementarily switched by the constant frequency and the constant duty cycle so that the energy storage voltages Vb1, Vb2 naturally transfer energy to each other according to the voltage level. In one embodiment, the duty cycle is preferably 50%, and the frequency may be determined according to actual circuit requirements (for example, but not limited to 50 kHz).

When the energy storage voltage Vb1 is lower, the first winding Np2 may directly couple energy to the first winding Np1 through the common (iron) core so that the energy storage unit 122 corresponding to the energy storage voltage Vb1 is quickly stored energy and charged (and vice versa). Take FIG. 4 as an example, the parameters of the resonance tank Rt includes a capacitance of the capacitor Cr, an inductance of the inductor Lr, and turns of the first windings Np1,Np2. However, the types of parameters included will vary according to the structure of the resonance tank Rt. Mainly, the parameters of the resonant tank Rt and the control logic of the first switch unit Q1 and the second switch unit Q2 of the two primary-side circuits 142 in the same primary-side module 142G should be the same. In one embodiment, the signals of controlling the first switch unit Q1 and the second switch unit Q2 may be provided by an external circuit/device outside the power supply system 100, an additional controller (not shown) inside the power supply system 100, or the control unit 18 of controlling the power stage circuit 16.

If the signals of controlling the first switch unit Q1 and the second switch unit Q2 are provided by the control unit 18 of controlling the power stage circuit 16, besides the first control signal assembly Sg1 of controlling the power stage circuit 16, the control unit 18 further provides a second control signal assembly Sg2 for controlling the first switch unit Q1 and the second switch unit Q2. The second control signal assembly Sg2 includes a first control signal Sc1 and a second control signal Sc2, and the first control signal Sc1 is used to control the first switch unit Q1 and the second control signal Sc2 is used to control the second switch unit Q2. In particular, the first control signal Sc1 and the second control signal Sc2 are complementary, and a frequency and a duty cycle are constant.

Please refer to FIG. 3 and FIG. 4 again, the induction units Us1, Us2 are coupled in parallel, and respectively coupled to the resonance tanks Rt of the two primary-side circuits 142 in the primary-side module 142G so as to form a balance circuit 15 having the induction units Us1, Us2 and two or more primary-side modules 142G. Specifically, the induction unit Us1 and the first windings Np1, Np2 are common-core, and the induction unit Us2 and the first windings Np3,Np4 are common-core. Since the induction units Us1, Us2 are coupled in parallel, the energy of the energy storage voltages Vb1-Vb4 can be directly coupled to the lower energy party through the induction unit Us1, Us2 in parallel (under the premise of not being limited to a common core for all windings) so that the energy storage unit 122 with lower energy can be quickly stored and charged. Accordingly, the advantage of the circuit structure and control method of the auxiliary power circuit 14 in FIG. 3 is that the excessively high energy can be recycled and used in a coupling manner, instead of being consumed by a resistor (causing additional power loss, heat dissipation, component cost, etc.) and the response speed is faster.

If the energy of the energy storage voltage Vb1 is lower than the energy storage voltages Vb2-Vb4, the energy of the energy storage voltages Vb3, Vb4 is directly coupled to the induction unit Us1 through the parallel-connected induction unit Us2 with the induction unit Us1, and is coupled to the first winding Np1 through the induction unit Us1 and the first winding Np1 with the common-core circuit structure. Similarly, the energy of the energy storage voltage Vb2 is coupled to the first winding Np1 through the first winding Np2 and the first winding Np1 with the common-core circuit structure. Therefore, the energy storage unit 122 corresponding to the energy storage voltage Vb1 can be quickly stored energy and charged according to the characteristics of the energy storage voltages Vb1-Vb4 that the energy is naturally transferred (delivered) to each other. In one embodiment, since the balance circuit 15 needs to transfer energy between two or more primary-side modules 142G, the number of primary-side circuits 142 is at least four, and the number of the induction units Us1, Us2 corresponding to the primary-side modules 142G is plural.

The rectification circuit Br is coupled to the induction units Us1-Us2 and the control unit 18, and is used to rectify the power provided by the induction units Us1-Us2 into a DC power Vdc and provide the DC power Vdc to supply power to the control unit 18. The rectification circuit Br and the control unit 18 are coupled to the potential terminal 166 or the second bus terminal 164 to use the potential of the potential terminal 166 or the potential of the second bus terminal 164 as a reference potential. In particular, if the second bus terminal 164 is coupled, the reference potential is the ground potential. On the other hand, if the power stage circuit 16 is a five-level conversion circuit and has three potential terminals 166-1 to 166-3, the rectification circuit Br and the control unit 18 may be selectively coupled to one of the potential terminals 166-1 to 166-3.

Please refer to FIG. 3 again, the auxiliary power circuit 14 further includes a module balance circuit 146. The module balance circuit 146 is coupled in parallel to the rectification circuit Br, and the module balance circuit 146 includes a switch SW and an energy consumption unit R. A first end of the switch SW is coupled to a first end of the rectification circuit Br, a second end of the switch SW is coupled to a first end of the energy consumption unit R, and a second end of the energy consumption unit R is coupled to a second end of the rectification circuit Br. The switch SW is turned on when the DC power Vdc is greater than a threshold value so that the energy consumption unit R consumes the DC power Vdc. In particular, the energy consumption unit R is, for example, but not limited to, a component or a circuit that can consume electrical energy such as a resistor or an impedance circuit. Specifically, since the plurality of conversion modules 1-1 to 1-n of the power supply system are used to equally distribute the medium-voltage DC MVDC (refer to FIG. 2), there is a problem of voltage balance of the input voltages Vin1-VinN of the corresponding conversion modules 1-1 to 1-n. That is, the input voltage Vin1-VinN of a certain conversion module 1-1 to 1-n is too high. In particular, the problem that the input voltage Vin1-VinN is too high can be solved by naturally transferring energy to each other through the circuit structure shown in FIG. 3 and FIG. 4.

However, since the DC power Vdc provided to the control unit 18 must generally be maintained within a specific range to make the control unit 18 normally operate, the excessive high DC power Vdc may trigger the protection mechanism of the control unit 18, thereby causing the power supply system 100 to fail. Therefore, the DC power Vdc may be maintained within a specific voltage range through the operation of the module balance circuit 146. Specifically, when the DC power Vdc supplied to the control unit 18 through the secondary-side circuit 144 is too high (that is, above the threshold), the energy consumption unit R is used to consume the DC power Vdc by turning on the switch SW so that the DC power Vdc maintains in a specific voltage range. Therefore, the excessive energy of the DC power Vdc may be consumed by the energy consumption unit R to achieve the voltage balance function of the DC power Vdc in each conversion module 1-1 to 1-n.

In one embodiment, the signal of controlling the switch SW may be provided by an external circuit/device outside the power supply system 100, an additional controller (not shown) inside the power supply system 100, or the control unit 18 of controlling the power stage circuit 16. If the signal of controlling the switch SW is provided by the control unit 18 of controlling the power stage circuit 16, the control unit 18 sets a threshold value and detects the DC power Vdc to control the switch SW to be turned on or turned off according to whether the DC power Vdc is higher than the threshold value.

Figure 5A:
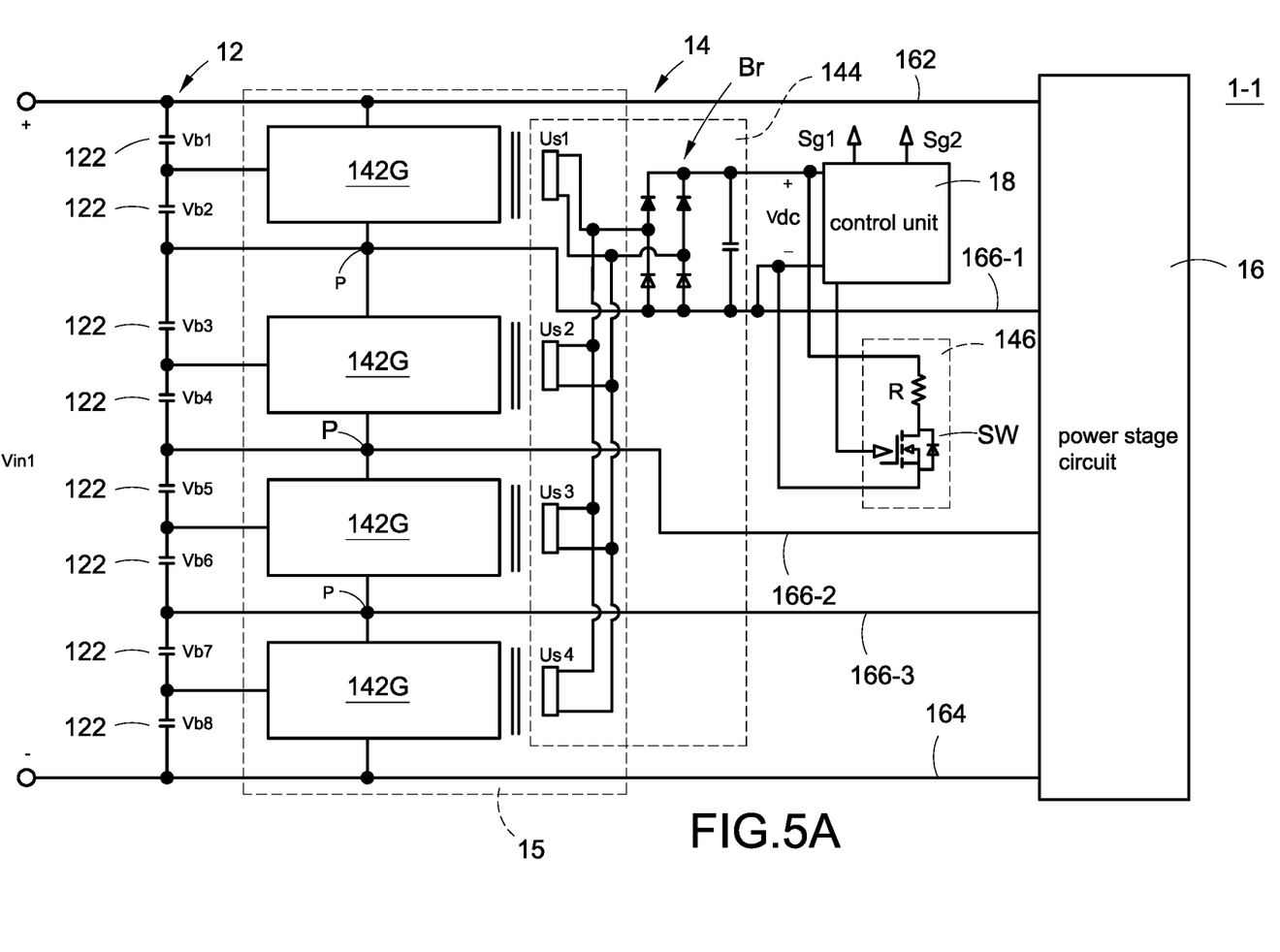
FIG. 5A is a block circuit diagram of the conversion module with the voltage balance function according to a second embodiment of the present disclosure.
Figure 5B:
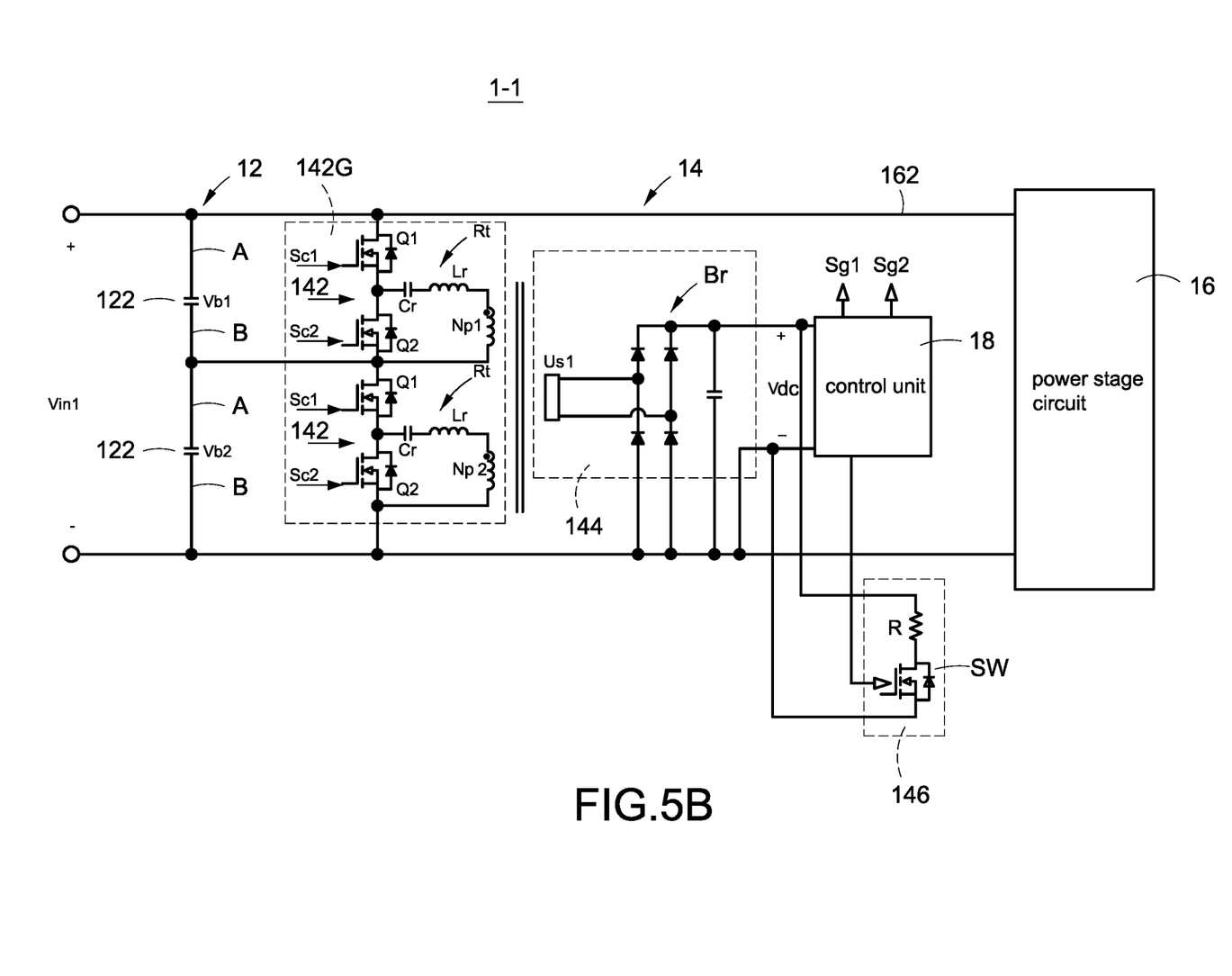
FIG. 5B is a block circuit diagram of the conversion module with the voltage balance function according to a third embodiment of the present disclosure.

Please refer to FIG. 5A, which shows a block circuit diagram of the conversion module with the voltage balance function according to a second embodiment of the present disclosure; please refer to FIG. 5B, which shows a block circuit diagram of the conversion module with the voltage balance function according to a third embodiment of the present disclosure, and also refer to FIG. 2 to FIG. 4. Compared with FIG. 3, the embodiment of FIG. 5A shows that the power stage circuit 16 is a five-level conversion circuit, and therefore the power stage circuit 16 includes a first bus terminal 162, a second bus terminal 164, and three potential terminals 166-1 to 166-3. There is one primary-side module 142G is disposed (coupled) between the two potentials, and the secondary-side circuit 144 includes a plurality of induction units Us1-Us4 and a rectification circuit Br. In this embodiment, the symmetrical resonance tank circuits allow energy to naturally transfer (deliver) to each other so that the energy storage voltages Vb1-Vb8 corresponding to the energy storage units 122 may be maintained in balance.

Compared with FIG. 3, the embodiment of FIG. 5B shows that the power stage circuit 16 is a single-level conversion circuit, and therefore the power stage circuit 16 includes a first bus terminal 162 and a second bus terminal 164. One primary-side module 142G is coupled between the first bus terminal 162 and the second bus terminal 164, and the secondary-side circuit 144 includes one induction unit Us1 and a rectification circuit Br. In this embodiment, the symmetrical resonance tank circuits allow energy to naturally transfer (deliver) to each other so that the energy storage voltages Vb1-Vb2 corresponding to the energy storage units 122 may be maintained in balance.

Figure 6A:
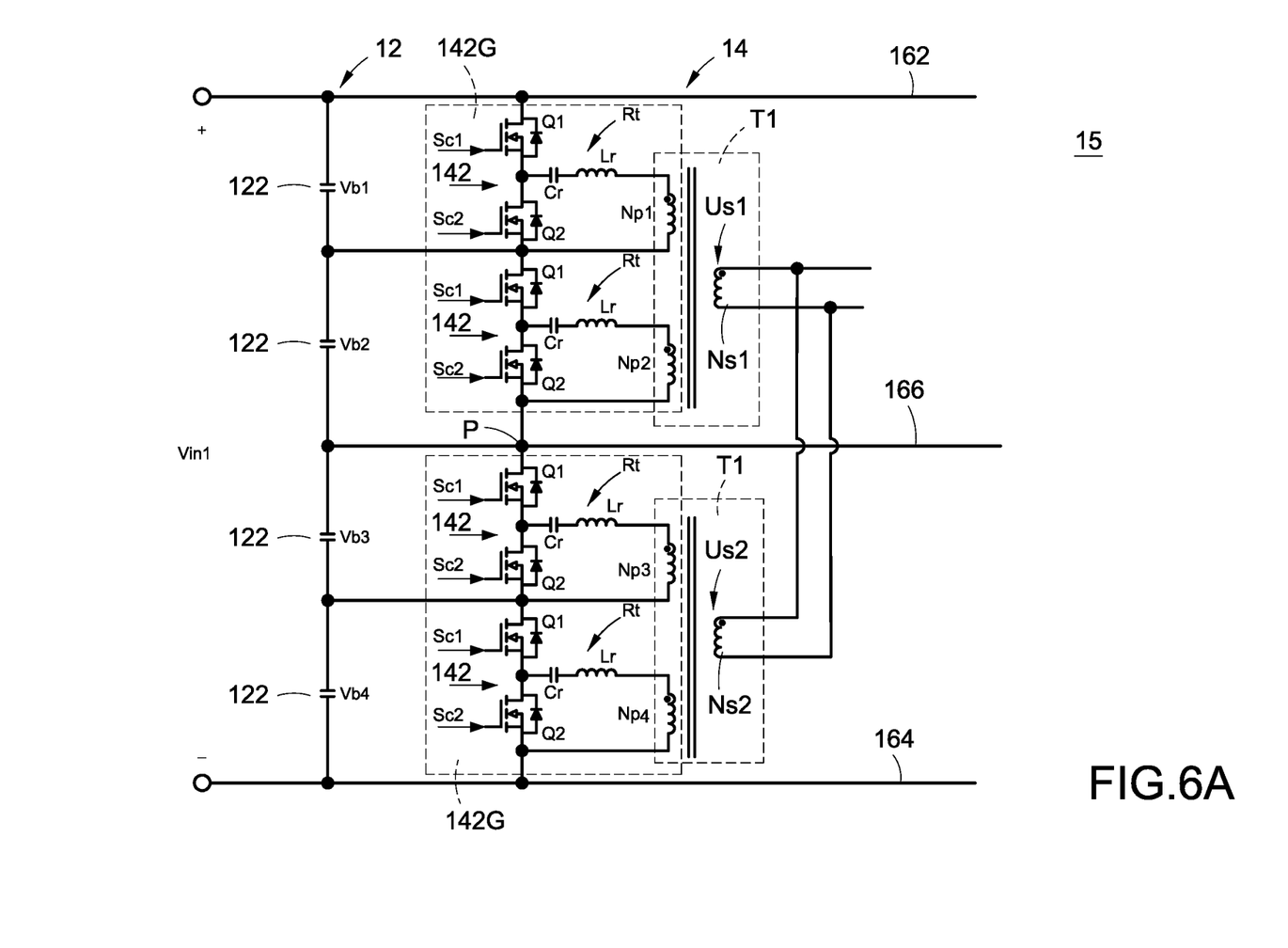
FIG. 6A is a circuit diagram of a balance circuit according to a first embodiment of the present disclosure.
Figure 6B:
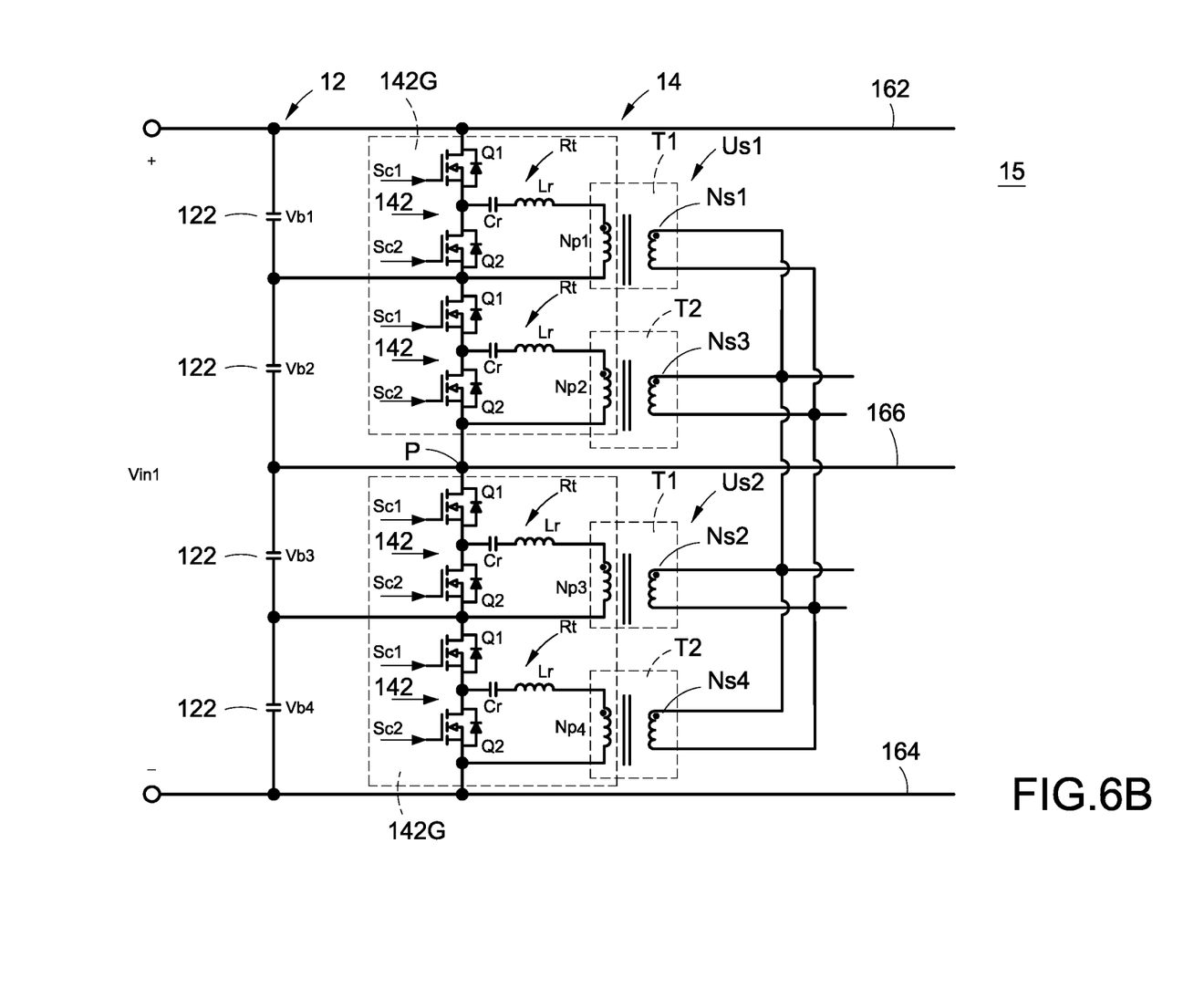
FIG. 6B is a circuit diagram of the balance circuit according to a second embodiment of the present disclosure.

Please refer to FIG. 6A, which shows a circuit diagram of a balance circuit according to a first embodiment of the present disclosure: please refer to FIG. 6B, which shows a circuit diagram of the balance circuit according to a second embodiment of the present disclosure, and also refer to FIG. 1 to FIG. 5B. FIG. 6A and FIG. 6B mainly show the implementation of the induction units Us1-Us2 cooperated with the first windings Np1-Np4 in a common-core manner. In FIG. 6A, each induction unit Us1, Us2 includes one second winding Ns1, Ns2, and the second winding Ns1 and the first windings Np1, Np2 of the two primary-side circuits 142 in one primary-side module 142G form a first transformer T1 with a common core, and the second winding Ns2 and the first windings Np3, Np4 of the two primary-side circuits 142 in one primary-side module 142G form a first transformer T1 with a common core. As shown in FIG. 6B, each induction unit Us1, Us2 includes one second winding Ns1, Ns2 and a third winding Ns3, Ns4. The second windings Ns1, Ns2 and the first windings Np1, Np3 of one primary-side circuit 142 form a first transformer T1 with a common core. The third windings Ns3, Ns4 and the first windings Np2, Np4 of the other primary-side circuit 142 form a second transformer T2 with a common core. Since FIG. 6A integrates windings into two first transformers T1, compared to FIG. 6B, the total volume (size) of the transformer can be reduced as the number of the iron cores is reduced from four to two. Also, the energy of the first windings Np1-Np2, Np3-Np4 with the common (iron) core can be directly transferred through the coupling of the primary side, without transmission through the secondary side. Therefore, the embodiment in FIG. 6A is a preferred embodiment.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An auxiliary power circuit of a conversion module configured for supplying power to a control unit, an input end of the conversion module comprising an even number of energy storage units coupled in series, and each energy storage unit comprising a first end and a second end, the auxiliary power circuit comprising:
   an even number of primary-side circuits, and each primary-side circuit comprising:
      a first switch unit comprising a first end and a second end, and the first end of the first switch unit correspondingly coupled to the first end of one of the energy storage units,
      a second switch unit comprising a first end and a second end, and the first end of the second switch unit coupled to the second end of the first switch unit, and the second end of the second switch unit correspondingly coupled to the second end of one of the energy storage units, and
      a resonance tank coupled in parallel to the second switch unit, and
   a secondary-side circuit comprising:
      at least one induction unit coupled to the two resonance tanks of the two primary-side circuits, and
      a rectification circuit coupled to the at least one induction unit and the control unit, and configured to rectify a power provided by the at least one induction unit into a DC power and supply the DC power to the control unit.

2. The auxiliary power circuit as claimed in claim 1, further comprising:
   a module balance circuit coupled in parallel to the rectification circuit, and the module balance circuit comprising:
      a switch coupled to the rectification circuit, and configured to be turned on according to the DC power being higher than a threshold value, and
      an energy consumption unit coupled in series to the switch, and configured to consume the DC power according to the turned-on switch.

3. The auxiliary power circuit as claimed in claim 1, wherein the resonance tank of each primary-side circuit comprises a parameter, and the parameters of the two resonance tanks of the two primary-side circuits are the same.

4. The auxiliary power circuit as claimed in claim 3, wherein the resonance tank comprises a capacitor, an inductor, and a first winding coupled in series, and the parameter comprises a capacitance of the capacitor, an inductance of the inductor, and a turn of the first winding.

5. The auxiliary power circuit as claimed in claim 4, wherein the at least one induction unit comprises a second winding,
   wherein the second winding and the two first windings of the two primary-side circuits form a first transformer with a common core.

6. The auxiliary power circuit as claimed in claim 4, wherein the at least one induction unit comprises a second winding and a third winding,
   wherein the second winding and the first winding of one of the two primary-side circuits form a first transformer with a common core, and the third winding and the first winding of the other of the two primary-side circuits form a second transformer with a common core.

7. The auxiliary power circuit as claimed in claim 1, wherein the first switch unit and the second switch unit are complementarily switched at a frequency and a duty cycle, and the frequency and the duty cycle are constant.

8. A balance circuit of a conversion module, an input end of the conversion module comprising an even number of energy storage units coupled in series, and each energy storage unit comprising a first end and a second end, the balance circuit comprising:
   an even number of primary-side circuits, and each primary-side circuit comprising:
      a first switch unit comprising a first end and a second end, and the first end of the first switch unit correspondingly coupled to the first end of one of the energy storage units,
      a second switch unit comprising a first end and a second end, and the first end of the second switch unit coupled to the second end of the first switch unit, and the second end of the second switch unit correspondingly coupled to the second end of one of the energy storage units, and
      a resonance tank coupled in parallel to the second switch unit, and
   a secondary-side circuit comprising:
      a plurality of induction units coupled in parallel to each other, and respectively coupled to the two resonance tanks of the two primary-side circuits,
   wherein the number of the primary-side circuits is at least four.

9. The balance circuit as claimed in claim 8, wherein the resonance tank of each primary-side circuit comprises a parameter, and the parameters of the two resonance tanks of the two primary-side circuits are the same.

10. The balance circuit as claimed in claim 9, wherein the resonance tank comprises a capacitor, an inductor, and a first winding coupled in series, and the parameter comprises a capacitance of the capacitor, an inductance of the inductor, and a turn of the first winding.

11. The balance circuit as claimed in claim 10, wherein each induction unit comprises a second winding,
   wherein the second winding and the two first windings of the two primary-side circuits form a first transformer with a common core.

12. The balance circuit as claimed in claim 10, wherein each induction unit comprises a second winding and a third winding,
   wherein the second winding and the first winding of one of the two primary-side circuits form a first transformer with a common core, and the third winding and the first winding of the other of the two primary-side circuits form a second transformer with a common core.

13. The balance circuit as claimed in claim 9, wherein the first switch unit and the second switch unit are complementarily switched at a frequency and a duty cycle, and the frequency and the duty cycle are constant.

14. A power supply system comprising:
   a plurality of conversion modules, each conversion module comprising an input end, and the input ends of the plurality of conversion modules coupled in series, the input end comprising an even number of energy storage units coupled in series, and each energy storage unit comprising a first end and a second end, each conversion module comprising:
   an auxiliary power circuit comprising:
      an even number of primary-side circuits, and each primary-side circuit comprising:
         a first switch unit comprising a first end and a second end, and the first end of the first switch unit correspondingly coupled to the first end of one of the energy storage units, a second switch unit comprising a first end and a second end, and the first end of the second switch unit coupled to the second end of the first switch unit, and the second end of the second switch unit correspondingly coupled to the second end of one of the energy storage units, and a resonance tank coupled in parallel to the second switch unit, and a secondary-side circuit comprising:

at least one induction unit coupled to the two resonance tanks of the two primary-side circuits, and a rectification circuit coupled to the at least one induction unit, and configured to rectify a power provided by the at least one induction unit into a DC power, a power stage circuit coupled to the input end, and a control unit coupled to the rectification circuit and the power stage circuit, and configured to receive the DC power to operate and to control the power stage circuit.

15. The power supply system as claimed in claim 14, wherein the even number of primary-side circuits form a primary-side module in pairs, and the power stage circuit comprises:

a first bus terminal coupled to the first end of the first series-connected energy storage unit, and a second bus terminal coupled to the second end of the last series-connected energy storage unit.

16. The power supply system as claimed in claim 15, wherein the power stage circuit further comprises:

a potential terminal coupled to a node between two primary-side modules, wherein the secondary-side circuit and the control unit are coupled to the potential terminal or the second bus terminal to use a potential of the potential terminal or a potential of the second bus terminal as a reference potential.

17. The power supply system as claimed in claim 15, wherein the auxiliary power circuit further comprises:

a module balance circuit coupled in parallel to the rectification circuit, and the module balance circuit comprises:

a switch coupled to the rectification circuit, and an energy consumption unit coupled in series to the switch, and configured to consume the DC power when the switch is turned on, wherein the control unit is configured to detect the DC power, and control the switch to be turned on when the DC power is higher than a threshold value.

18. The power supply system as claimed in claim 14, wherein the control unit is configured to provide a first control signal assembly to control the power stage circuit, and provide a second control signal assembly to control the first switch unit and the second switch unit.

19. The power supply system as claimed in claim 18, wherein the second control signal assembly comprises a first control signal of controlling the first switch unit and a second control signal of controlling the second switch unit: the first control signal and the second control signal are complementary, and a frequency and a duty cycle of the first control signal and the second control signal are constant.

* * * * *